Patented Dec. 6, 1949

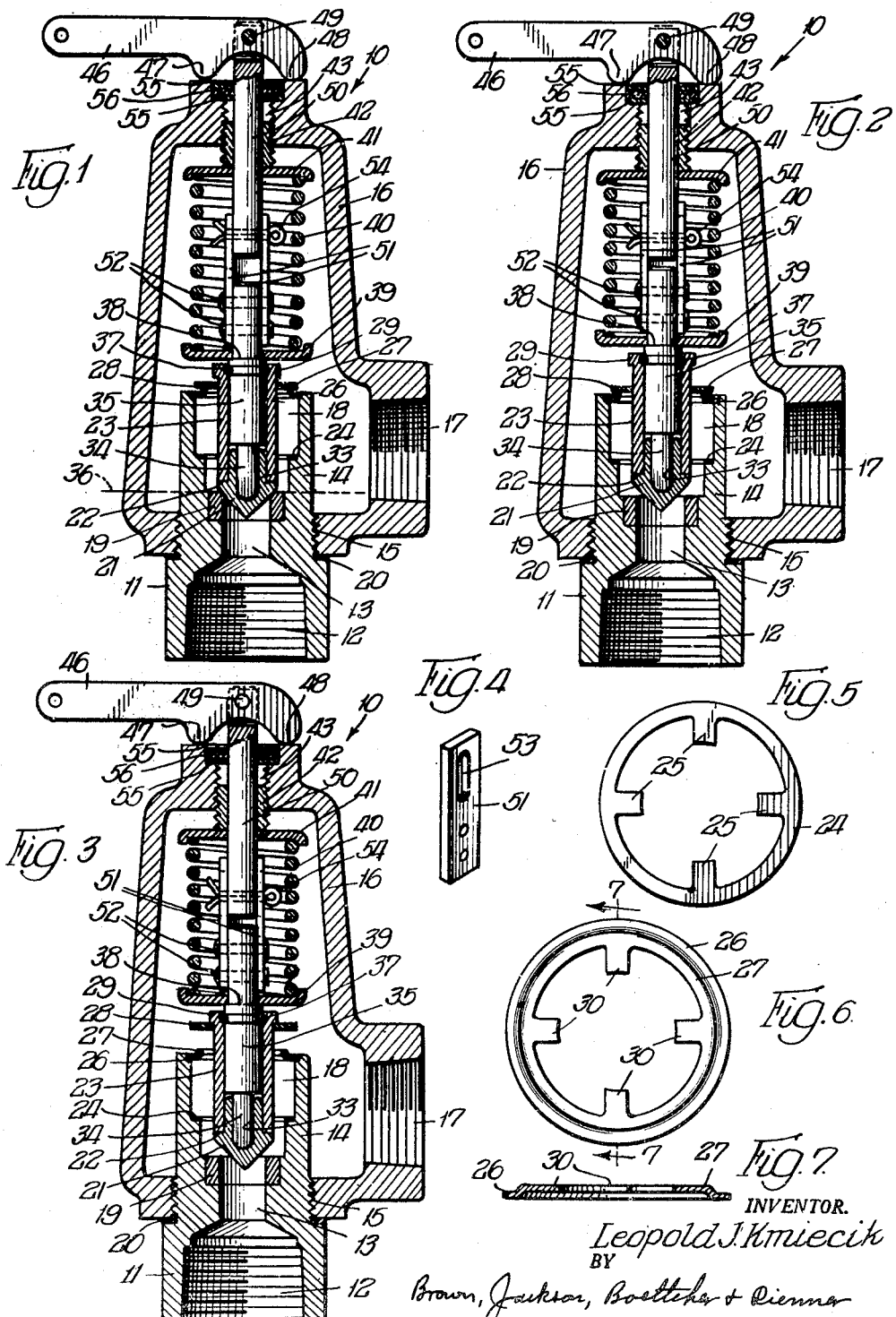

2,490,219

UNITED STATES PATENT OFFICE 2,490,219

PRESSURE RELIEF VALVE CONSTRUCTION

Leopold J. Kmiecik, Chicago, Ill., assignor to McDonnell & Miller, Inc., Chicago, Ill., a corporation of Delaware Application June 22, 1948, Serial No. 34,493

11 Claims. (Cl. 137—53)

This invention relates, generally, to valves, and it has particular relation to pressure relief valves.

Among the objects of this invention are: To construct a pressure relief valve which is accurate in operation, is unlikely to get out of order in use, and which can be manufactured economically; to construct the valve so that it will open with a pop, thereby increasing its capacity and preventing dripping action; to utilize liquid pressure and velocity to operate the valve with a pop; to avoid the use of bellows, diaphragms and the like in the valve; to enclose the valve operating and controlling mechanism in a liquid tight housing; to open the valve manually; and to provide for operating the valve in response to change in pressure without requiring corresponding operation of the manual operating mechanism.

Other objects of this invention will, in part, be obvious and in part appear hereinafter.

This invention is disclosed in the embodiment thereof shown in the accompanying drawing and it comprises the features of construction, combination of elements and arrangement of parts which will be exemplified in the construction hereinafter set forth and the scope of the application which will be indicated in the appended claims.

For a more complete understanding of the nature and scope of this invention, reference can be had to the following detailed description, taken together with the accompanying drawing, in which:

Figure 1 is a longitudinal sectional view of a valve constructed in accordance with this invention, the valve being shown in the closed position;

Figure 2 is a view similar to Figure 1, but showing the valve in the partially open position as a result of the application of excess pressure to the valve member;

Figure 3 is a view similar to Figures 1 and 2 but showing the valve in the open position;

Figure 4 is a perspective view of one of the links employed to provide a lost motion connection between the try out handle stem and the lower valve stem;

Figure 5 is a top plan view of the lower guide disc;

Figure 6 is a top plan view of the upper guide disc; and

Figure 7 is a detail sectional view taken along the line 7—7 of Figure 6.

Referring now particularly to Figure 1 of the drawing, it will be observed that the reference character 10 designates, generally, a pressure relief valve in which the present invention is embodied. The valve 10 includes a valve body 11 that may be formed of brass. The valve body 11, as shown, is provided with an internally threaded inlet opening 12 which connects through a throat 13 with an integrally formed tubular section 14 that is threaded, as indicated at 15, into the lower end of a spring housing 16 which may be formed of cast iron. The spring housing 16 has an internally threaded outlet opening 17. It will be understood that the inlet and outlet openings 12 and 17 may be connected into the piping system in a manner well understood by those skilled in the art. The upper end of the tubular section 14 provides a huddling chamber 18 which serves to trap the liquid and create the pop action of the valve in a manner to be described. At the lower end of the huddling chamber 18 there is a valve seat 19 which may be in the form of a ring insert of stainless steel. The opening through the valve seat 19 may be of the same diameter as that of the throat 13. A gasket 20 of suitable material is provided between the valve body 11 and spring housing 16 at the base of the threaded section 15 to provide a fluid tight seal.

The opening through the valve seat 19 may be closed by a conical valve member 21 that may be formed of stainless steel. The valve member 21 has a shoulder 22 which bears against the lower end of a valve sleeve 23 that may be formed of brass. As shown, the valve member 21 is telescoped with the lower end of the valve sleeve 23.

The valve sleeve 23 is arranged to reciprocate vertically through the huddling chamber 18 in the tubular section 14 when sufficient pressure is applied to or removed from the underside of the conical valve member 21 to effect such operation. In order to guide the valve sleeve 23 and thereby the conical valve member 21 in this movement, there is provided a lower guide disc 24 at the bottom of the huddling chamber 18. The disc 24 may be formed of brass and, as shown in Figure 5, is provided with radially inwardly extending arms 25 which guide the valve sleeve 23 in its movement up and down while leaving a clear space therebetween to permit free flow of fluid through the huddling chamber 18. The lower guide disc 24 is staked in position in the tubular section 14. At the upper end of the huddling chamber 18 there is provided an upper guide disc 26 which is staked in place and is formed of brass like the lower guide disc 24. As shown more clearly in Figures 6 and 7 of the drawings, the upper guide disc 26 has an annular inner raised section 27 which provides a seat for a washer 28 that is loosely mounted on the valve sleeve 23 underneath a shoulder 29 at its upper end. The upper guide disc 26 has radially inwardly extending arms 30 which, like the arms 25 of the lower guide disc 24, serve to hold the valve sleeve 23 centrally in the huddling chamber 18. The spaces between the arms 30 permit the free flow of liquid into the spring housing 16 and out through the outlet opening 17.

As shown in the drawing, the conical valve member 21 has a central opening 33 into which the lower end 34 of a lower stem 35 projects. The lower end 34 extends into the conical valve member 21, as shown in Figure 1, to a position that is slightly below the plane, indicated by the broken line 36, which extends through the plane of contact of the conical valve member 21 with the valve seat 19. This arrangement serves to seat the valve member 21 evenly around the valve seat 19. The lower stem 35 extends upwardly through the valve sleeve 23 and is secured thereto by a snap ring 37 which is located in correspondingly positioned grooves in the sleeve 23 and the lower stem 35.

The lower stem 35 has a shoulder 38 just above the snap ring 37 against which the underside of a cupped washer 39 bears for receiving the lower end of a coil compression spring 40, the tension of which determines the pressure at which the valve member 21 will be lifted away from the valve seat 19. At its upper end the spring 40 fits into a cupped washer 41 that bears against the lower end of an adjusting screw 42 which is threaded into an opening 43 at the upper end of the spring housing 16. By adjusting the position of the screw 42 it is possible to change the tension of the spring 40 and thereby to change the pressure at which the valve member 21 will be lifted off of the valve seat 19.

It is desirable to provide for manually lifting the valve member 21 off of the valve seat 19. At the same time, it is desirable that the automatic movement of the valve member 21 from the valve seat 19 shall not be transmitted to the manual operating mechanism which is employed for opening the valve. For this purpose a try out handle 46 is provided and it is fulcrumed at 47 and 48 on the spring housing 16. The try out handle 46 is pivoted at 49 to the upper end of a try out handle stem 50 which extends downwardly through the adjusting screw 42 and the cupped washer 41 toward the upper end of the lower stem 35. The stems 35 and 50 are interconnected by a pair of links 51, one of which is shown in Figure 4. The links 51 may be secured to the upper end of the lower stem 35 by rivets 52. However, a sliding connection is provided with the lower end of the try out handle stem 50. For this purpose the links 51 are provided with slots 53 at their upper ends and a cotter pin 54 extends therethrough and through the lower end of the handle stem 50. This construction permits the valve member 21 to be lifted off of the valve seat 19 by operation of the try out handle 46. However, the movement of the valve member 21 upwardly in response to pressure applied to its under surface is not transmitted to the try out handle stem 50 or to the try out handle 46 because of the lost motion connection provided by the slots 53 between the stems 35 and 50.

In order to prevent leakage past the try out handle stem 50 at the upper end of the spring housing 16 a pair of steel washers 55 is provided between which there is positioned a leather packing 56. This gasket construction fits snugly in the upper end of the spring housing 16 while permitting the try out handle stem 50 to be moved in response to movement of the try out handle 46.

In operation it will be understood that the position of the adjusting screw 42 is located so as to provide the desired tension in the coil compression spring 40. When the fluid pressure system connected to the inlet opening 12 is operating at a pressure which is below the pressure for which the spring 40 is set, it holds the valve member 21 against the upper edge of the valve seat 19. The washer 28, which fits loosely around the valve sleeve 23 at this time engages the annular inner raised section 27 of the upper guide disc 26 and closes the upper end of the huddling chamber 18. Assuming now that sufficient pressure is applied to overcome the force exerted by the spring 40, the valve member 21 is raised off of the valve seat 19 as shown in Figure 2 while the washer 28 remains in position on the annular inner raised section 27. This allows the fluid to pass through the opening in the valve seat 19 and to accumulate in the huddling chamber 18 where it exerts an upward pressure on the washer 28. When sufficient pressure is developed in the huddling chamber 18, the washer 28 is moved upwardly, as shown in Figure 3, with a pop and thus creates a larger opening for the discharge of the liquid at excess pressure into the spring housing 16 from which it may escape through the outlet opening 17. When sufficient fluid has been discharged in the manner just described to lower the pressure, the coil compression spring 40 is capable of moving the lower stem 35 downwardly, carrying with it the washer 28 and the valve member 21, the latter seating again against the upper edge of the valve seat 19. The washer 28 falls under the influence of gravity into position against the annular inner raised section 27 of the upper guide disc 26.

Since certain changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. A pressure relief valve comprising, in combination, a valve housing having inlet and exhaust openings; a tubular section constituting an extension of said valve housing, extending upwardly into the same from said inlet opening, and providing a huddling chamber at its upper end; a valve seat at the lower end of said huddling chamber, a conical valve member for engaging said valve seat and arranged to be acted upon from underneath by fluid pressure transmitted through said inlet opening, a valve sleeve telescoped at its lower end with the upper end of said valve member and having a radially outwardly-extending shoulder at its upper end, guide discs secured near the bottom and top of said huddling chamber and having radially inwardly extending fingers acting to guide said valve sleeve in its vertical movement with the spaces therebetween permitting free fluid flow through said huddling chamber, a washer fitting loosely around said valve sleeve underneath said shoulder thereon and normally resting on the top guide disc to close the openings between its inwardly extending fingers, a valve stem secured to said sleeve with its lower end telescoped with said sleeve and said valve member and its upper end projecting above said sleeve, and a coil compression spring reacting between said valve housing and said valve stem to hold said valve member in engagement with said valve seat until a predetermined pressure is applied to its underside whereupon said valve seat, sleeve and valve stem are moved upwardly against the biasing force of said spring and pressure builds up in said huddling chamber while said washer remains in contact with said top guide disc until sufficient pressure is built up to move said washer upwardly with a pop against said shoulder and thereafter the fluid is discharged into said housing and out of the same through said exhaust opening.

2. The invention, as set forth in claim 1, wherein the top guide disc has an annular inner raised section that provides a seat engageable by the washer in its lowermost position.

3. The invention, as set forth in claim 1, wherein the lower end of the valve stem extends into the valve member and operatively engages the same below its plane of contact with the valve seat.

4. The invention, as set forth in claim 1, wherein manually operable try out means extend into the housing and is connected to the valve stem for lifting the same against the biasing force of the coil compression spring.

5. The invention, as set forth in claim 4, wherein lost motion means interconnects the manually operable try out means and the valve stem whereby said manually operable try out means is not operated when said valve stem is lifted as a result of excess pressure applied to the underside of the valve member.

6. A pressure relief valve comprising, in combination, a valve housing having inlet and exhaust openings, a tubular section constituting an extension of said valve housing, extending upwardly into the same from said inlet opening, and providing a huddling chamber at its upper end; a valve seat at the lower end of said huddling chamber, a conical valve member for engaging said valve seat and arranged to be acted upon from underneath by fluid pressure transmitted through said inlet opening, a valve sleeve telescoped at its lower end with the upper end of said valve member and having a radially outwardly extending shoulder at its upper end, guide discs secured near the bottom and top of said huddling chamber and having radially inwardly extending fingers acting to guide said valve sleeve in its vertical movement with the spaces therebetween permitting free fluid flow through said huddling chamber, a washer fitting loosely around said valve sleeve underneath said shoulder thereon and normally resting on the top guide disc to close the openings between its inwardly extending fingers, a valve stem secured to said sleeve with its lower end telescoped with said sleeve and said valve member and its upper end projecting above said sleeve, a coil compression spring reacting between said valve housing and said valve stem to hold said valve member in engagement with said valve seat until a predetermined pressure is applied to its underside whereupon said valve seat, sleeve and valve stem are moved upwardly against the biasing force of said spring and pressure builds up in said huddling chamber while said washer remains in contact with said top guide disc until sufficient pressure is built up to move said washer upwardly with a pop against said shoulder permitting the fluid to discharge into said housing and out of the same through said exhaust opening, and manually operative try out means comprising a handle stem extending through the top of the housing in alignment with the valve stem underneath and connected to the latter for lifting the same against the biasing force of the coil compression spring, and a try out handle pivoted to the upper end of said handle stem and fulcrumed on said housing.

7. The invention, as set forth in claim 6, wherein the stems are interconnected by a link secured rigidly at one end to one stem and having a vertical slot at the other end, and a detent is carried by the other stem and extends into said slot at one end whereby the handle stem remains stationary when the valve stem is lifted as a result of excess pressure applied to the underside of the valve member.

8. The invention, as set forth in claim 6, wherein packing is provided in the housing and the handle stem extends through it whereby leakage around the same is prevented.

9. The invention, as set forth in claim 6, wherein the coil compression spring surrounds the stems and bears against cupped washers at its ends, the lower cupped washer bears against a shoulder intermediate the ends of the valve stem and the upper cupped washer bears against an adjusting screw threaded into the housing whereby the spring tension is varied to adjust the valve to operate at various pressures.

10. A pressure relief valve comprising, in combination, a valve housing having inlet and exhaust openings, a tubular section constituting an extension of said valve housing, extending upwardly into the same from said inlet opening, and providing a huddling chamber at its upper end, a valve seat at the lower end of said huddling chamber, a valve member for engaging said valve seat and arranged to be acted upon from underneath by fluid pressure transmitted through said inlet opening, a valve sleeve telescoped at its lower end with the upper end of said valve member, guide disc means secured near the bottom and top of said huddling chamber and having radially inwardly extending fingers acting to guide said valve sleeve in its vertical movement with the spaces therebetween permitting free fluid flow through said huddling chamber, a washer fitting loosely around said valve sleeve and normally tending to close said huddling chamber, a valve stem secured to said sleeve with its lower end telescoped with said sleeve and said valve member and its upper end projecting above said sleeve, and a coil compression spring reacting between said valve housing and said valve stem to hold said valve member in engagement with said valve seat until a predetermined pressure is applied to its underside whereupon said valve seat, sleeve and valve stem are moved upwardly against the biasing force of said spring and pressure builds up in said huddling chamber while said washer remains seated in its normally closed position until sufficient pressure is built up to move said washer upwardly with a pop to its open position and thereafter the fluid is discharged into said housing and out of the same through said exhaust opening.

11. A pressure relief valve comprising, in combination, a valve housing having inlet and exhaust openings, a tubular section constituting an extension of said valve housing, extending upwardly into the same from said inlet opening, and providing a huddling chamber at its upper end, a valve seat at the lower end of said huddling chamber, a valve member for engaging said valve seat and arranged to be acted upon from underneath by fluid pressure transmitted through said inlet opening, a valve sleeve telescoped at its lower end with the upper end of said valve member, guide disc means secured near the bottom and top of said huddling chamber and having radially inwardly extending fingers acting to guide said valve sleeve in its vertical movement with the spaces therebetween permitting free fluid flow through said huddling chamber, a washer mounted for relative axial movement of said valve sleeve and normally tending to close said huddling chamber, a valve stem secured to said sleeve with its lower end telescoped with said sleeve and said valve member and its upper end projecting above said sleeve, and a coil compression spring reacting between said valve housing and said valve stem to hold said valve member in engagement with said valve seat until a predetermined pressure is applied to its underside whereupon said valve seat, sleeve and valve stem are moved upwardly against the biasing force of said spring and pressure builds up in said huddling chamber while said washer remains seated in its normally closed position until sufficient pressure is built up to move said washer upwardly with a pop to its open position and thereafter the fluid is discharged into said housing and out of the same through said exhaust opening.

LEOPOLD J. KMIECIK.

REFERENCES CITED

The following references are of record in the file of this patent:

UNITED STATES PATENTS

| Number | Name | Date |
|---|---|---|
| 287,131 | Jarecki | Oct. 23, 1883 |
| 461,149 | Fogel | Oct. 13, 1891 |